United States Patent Office 3,066,071
Patented Nov. 27, 1962

3,066,071
PREVENTION OF BOVINE MASTITIS
William Thomas Akers, Dumont, Walter Leighton Clark III, Ramsey, and Alvin Richard Whitehill, Montvale, N.J., assignors to American Cyanamid Company, New York, N.Y., a corporation of Maine
No Drawing. Filed Sept. 22, 1959, Ser. No. 841,438
4 Claims. (Cl. 167—53.2)

This invention relates to a method of preventing diseases of the udder in cattle, and more particularly to a method of coating the teats of cattle for the prevention of bovine mastitis.

Diseases of the udder in cattle, particularly mastitis, have become very prevalent, so much so that it is estimated that one-third of the cattle in the United States are infected with mastitis. Mastitis of the teat canal, teat cistern, milk cistern, milk ducts, and alveoli, is a problem of far reaching importance in the dairy industry. This condition ordinarily results in poor and contaminated milk quality and a lowered output of milk, not only with dairy cows, but also with dairy goats. Each year it causes serious economic losses to the whole dairy industry which amount to about 225 millions of dollars.

Bovine mastitis, an acute or chronic inflammation of one or more of the mammary glands, is caused by bacterial invasion of the host through the teat canal by organisms such as Streptococcus agalactiae, Streptococcus dysgalactiae, Staphylococcus aureus, Aerobacter aerogenes, Escherichia coli, Pseudomonas aeruginosa, and Corynebacteria pyogenes. Acute mastitis usually is sporadic, has rapid onset, and appears as a diffuse swelling in an udder quarter that previously has been normal. Acute mastitis with a very rapid onset and fairly severe toxemia is usually due to coliform organisms. When first diagnosed, acute mastitis or cases with fever, lameness or marked mammary swelling are generally treated with antibiotics such as chlortetracycline, neomycin, and polymyxin. Chronic mastitis is characterized by repeated mild attacks of mammary swelling with the production of milk containing clots or flakes. Most cases of chronic mastitis are due to streptococci or micrococci and the herd history usually indicates that several animals in the herd are affected. Older animals are more likely to have the disease, and latent, subclinical and mild cases usually are numerous in an infected herd. Therapy for chronic mastitis usually includes antibiotics infused in the teat canal. Gangrenous mastitis, characterized by a cold bluish discoloration on the teats or ventral udder, may be due to *Clostridium perfringens* and occasionally other organisms.

In spite of the effectiveness of modern medicaments, bovine mastitis is still as prevalent as heretofore. One of the main reasons for this is that treatment by farmers and veterinarians is administered solely on the basis of the presence of mild clinical or severe clinical mastitis and success or failure of the treatment is judged by the disappearance of the clinical symptoms. Thus, treatment often serves only to force the disease into the nonclinical stage, whereupon it usually flares up at some future time. Another, and most important, reason for the failure of modern medicaments to control the disease is that the farmer and veterinarian have attempted to substitute treatment of the disease for the use of preventive methods.

The teat canal has a very tight constriction near the outer end, extending for a length of from one-quarter to three-quarter inch, depending on the breed of cattle, and then enlarging into a cavity in which the infection is likely to be present. This tight constriction, or teat orifice, is known as the streak canal. It is generally agreed that the streak canal is the main barrier in preventing mastitis causing organisms from entering the udder and that numerous factors may limit the effectiveness of this barrier. Basically, therefore, infectious mastitis is a management problem since any method of management that tends to reduce the effectiveness of the streak canal may be predisposing to mastitis. Although there is general agreement that the streak canal is the main barrier to infection, nothing has been done heretofore on methods of increasing the effectiveness of the streak canal as a barrier to infection.

Our invention is based on the discovery that the effectiveness of the streak canal as a barrier in preventing mastitis causing organisms from entering the udder is enormously increased by the application of a pliable, peelable coating to the teats of the animal between milkings. The method of our invention prevents bovine mastitis by preventing the invasion of the udder by mastitis causing organisms via the teat canal.

It is surprising that the application of a pliable, peelable coating to the teats of a cow between milkings neither injures nor annoys the cow. It is even more surprising that such a pliable, peelable coating is so remarkably effective in preventing bovine mastitis since, in order to be peelable, the coating must be soft or low melting.

In practicing our invention, application of the pliable, peelable film or coating is made twice daily or as often as the cow is milked. The coating is removed by peeling imemdiately prior to the next milking. In practicing our invention, it is only necessary that the film or coating produced be flexible, elastic, relatively impermeable to moisture, adhesive but non-irritating to teat tissues, and easily removable at milking time by a simple peeling process. The pliable, peelable films or coatings of this invention may be applied to the teat as a solution of the coating composition in a volatile solvent, or simply as a melt of the coating composition. They may be applied by dipping the teat into the liquid, by spraying, or even by brushing the liquid on the teat. The volatile solevnt may be, for example, ethyl acetate, methylcyclohexanone, methylethyl ketone, nitroethane, 1-nitropropane, and the like.

Although various coating compositions may be utilized for the production of the peelable teat coatings of the present invention, we prefer the following coating compositions.

A typical formulation of a solution type peelable coating consists of 25 parts by weight of coating composition dissolved in 75 parts by weight of ethyl acetate. The coating composition consists of 72% by weight of a mixture of one part by weight of polyvinyl acetate plus 6.7 parts by weight of polyvinyl chloride and 28% by weight of trioctyl phosphate as a plasticizer. The resulting solution is applied to the clean teats of a cow by dipping. A perfect coating is formed which is easily peeled off. Although this typical formulation is preferred, other formulations may consist of from 20 to 30 parts by weight of coating composition dissolved in from 70 to 80 parts by weight of solvent. The coating composition may consist of 50–80% by weight of a mixture of one part by weight of polyvinyl acetate plus from about five to about fifteen parts by weight of polyvinyl chloride and 20–50% by weight of a plasticizer such as trioctyl phosphate, dibutyl sebacate, or dicapryl phthalate.

A typical formulation of a hot melt type peelable coating consists of 69–90% by weight of a suitable acylated glyceride and 10–40% by weight of a cellulose acetate butyrate. This hot melt coating is warmed to a melt at about 60° C. and applied to the clean teats of a cow by dipping. It solidifies upon contact with the teats and forms a perfect coating, which is easily peeled off. The acylated glyceride employed may be a mono- or diacylated glyceride wherein the acyl radicals are derived from saturated or unsaturated fatty acids having from 3 to 22 carbon atoms. The cellulose acetate butyrate employed may have, on a weight percent basis, the following constituent ranges:

| | |
|---|---|
| Acetyl | 6–32 |
| Butyryl | 15–50 |
| Hydroxyl | 0.5–2.5 |

However, within this range, the more desirable materials usually will be found in a smaller group containing some 10–25% acetyl; 25–45% butyryl; and about 1.0–2.2% hydroxyl.

Various pigments such as titanium dioxide or coloring materials such as F.D. & C. Lake Yellow #5 may be added to the solution or hot melt to produce a colored coating. Bacteriostatic or bactericidal agents such as chlortetracycline hydrochloride may also be added to the solution or hot melt so as to reduce the bacteria population on the surface of the teat. It should be noted, however, that the volatile solvent used should not be injurious to the animal, and the temperature required to produce a melt should not be so high as to be injurious to the animal.

In practicing this invention, the farmer will not only benefit by increasing his yield of top quality milk, but he can also make a larger supply of milk available for the manufacture of cheese. This is made possible by elimination of the use of antibiotics for the control of diseases of the udder such as mastitis. It is well known that milk containing any appreciable amount of an antibiotic does not lend itself to cheese manufacture.

It is an advantage of the present invention that this novel method may also be utilized for coating heifer teats to prevent infection during the first gestation period, and teats of a "dry cow" may be coated during the drying off process and during the remainder of the gestation period.

Another advantage of the present invention lies in the fact that the teat coating or film should be applied to a clean udder in order to provide optimum effectiveness, and therefore the practice of this invention would encourage the farmer to maintain good sanitary practices.

EXPERIMENTAL PROCEDURE

Four Holstein cows, five to ten years of age and producing approximately 50 pounds of milk daily, were utilized in this experiment. The experiment was divided into two periods for the purpose of studying individual quarter susceptibility to mastitis when the teats were unsealed or sealed.

During Period I, one front teat and one rear teat of each cow was sealed after each milking, whereas the remaining two teats were unsealed. The one rear teat and one front teat of each cow which were unsealed in Period I were sealed during Period II. The remaining two teats of each cow were not sealed during Period II.

The teat seals were produced with the preferred polyvinyl chloride/polyvinyl acetate formulation set forth above by dipping. The coating formed with this formulation was tough, elastic, and adhesive to teat tissues, but could be easily removed at milking time by a simple peeling process.

A polyethylene bag containing a broth culture of *Staphylococcus aureus* was attached to all teats eleven hours per day for two consecutive days during Period I and for eleven hours during Period II. This culture was isolated from cows that did not have mastitis. The organisms were found to have the ability to rapidly induce mastitis when infused into the udder of the cows from which they were isolated.

All cows tested negative to the Whiteside test (a standard clinical test for mastitis) prior to starting both experimental periods. Each cow was tested daily for mastitis by using the Whiteside test up to 72 hours after treatment during Period I and up to 48 hours after treatment during Period II. A twenty day changeover and treatment period with various antibiotics was necessary to remove all signs of mastitis produced during Period I before starting Period II.

The experimental results as determined by the Whiteside test are set forth in the following tables:

Table 1.—Reactions to the Whiteside Test During Period I

| Cow No. | | 1 | | | 2 | | | 3 | | | 4 | | |
|---|---|---|---|---|---|---|---|---|---|---|---|---|---|
| Hours after Treatment | | 24 | 48 | 72 | 24 | 48 | 72 | 24 | 48 | 72 | 24 | 48 | 72 |
| Quarters | Treatment | | | | | | | | | | | | |
| Left Front | Unsealed | − | − | − | − | 3+ | 3+ | 2+ | 3+ | 3+ | 1+ | 3+ | 3+ |
| Right Front | Sealed | − | − | − | − | − | − | − | − | − | − | − | − |
| Left Rear | Sealed | − | − | − | − | − | − | − | − | − | − | − | − |
| Right Rear | Unsealed | − | − | − | 2+ | 3+ | 3+ | − | − | 3+ | 3+ | 3+ | 2+ |

(−) Negative to Whiteside test.

Table 2.—Reactions to the Whiteside Test During Period II

| Cow No. | | 1 | | 2 | | 3 | | 4 | |
|---|---|---|---|---|---|---|---|---|---|
| Hours after Treatment | | 24 | 48 | 24 | 48 | 24 | 48 | 24 | 48 |
| Quarters | Treatment | | | | | | | | |
| Left Front | Sealed | − | − | 1+ | 1+ | − | − | − | − |
| Right Front | Unsealed | 1+ | − | 3+ | 3+ | 4+ | 4+ | 3+ | 3+ |
| Left Rear | Unsealed | − | − | 2+ | 2+ | 4+ | 3+ | 2+ | 2+ |
| Right Rear | Sealed | − | − | − | − | − | − | − | − |

(−) Negative to Whiteside test.

These experimental results clearly demonstrate that the sealings of a cow's teats with a pliable, peelable coating between milkings provides an effective barrier to mastitis causing organisms.

What is claimed is:

1. A process for the prevention of bovine mastitis which comprises coating the teats of a cow with a pliable, peelable, non-irritating film comprising not less than 50% by weight of a mixture of one part by weight of polyvinyl acetate plus from about 5 to about 15 parts by weight of polyvinyl chloride and correspondingly not more than 50% by weight of a component selected from the group consisting of trioctyl phosphate, dibutyl sebacate, and dicapryl phthalate.

2. A process for the prevention of bovine mastitis which comprises coating the teats of a cow with a pliable, peelable, non-irritating film comprising not more than 40% by weight of a cellulose acetate butyrate and correspondingly not less than 60% by weight of an acylated glyceride.

3. A process for the prevention of bovine mastitis which comprises coating the teats of a cow with a pliable, peelable, non-irritating film comprising from about 50% to about 80% by weight of a mixture of one part by weight of polyvinyl acetate plus seven parts by weight of polyvinyl chloride and from about 20% to about 50% by weight of trioctyl phosphate.

4. A process for the prevention of bovine mastitis which comprises coating the teats of a cow with a pliable, peelable, non-irritating film comprising from about 10% to about 20% by weight of a cellulose acetate butyrate and from about 80% to about 90% by weight of an acylated glyceride.

References Cited in the file of this patent

UNITED STATES PATENTS 2,804,073     Gallienne _____ Aug. 27, 1957

OTHER REFERENCES

Mastitis Controlled, May 1946, page 4.

Choy: U.S. Armed Forces Med. J., vol. III, No. 9, September 1952, pages 1241, 2154, and 1255.

Dykstra: Vet. Med., vol. 48, June 1953, page 249.